(No Model.)
G. D. BURTON & E. E. ANGELL.
APPARATUS FOR BRAZING METALS BY ELECTRICITY.
No. 537,013. Patented Apr. 9, 1895.
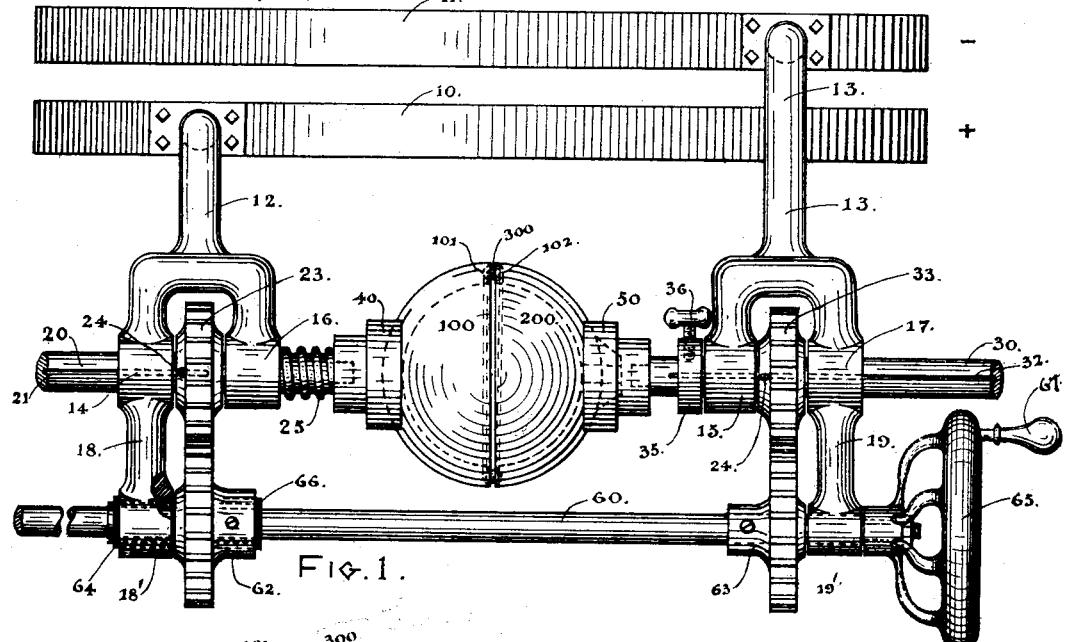
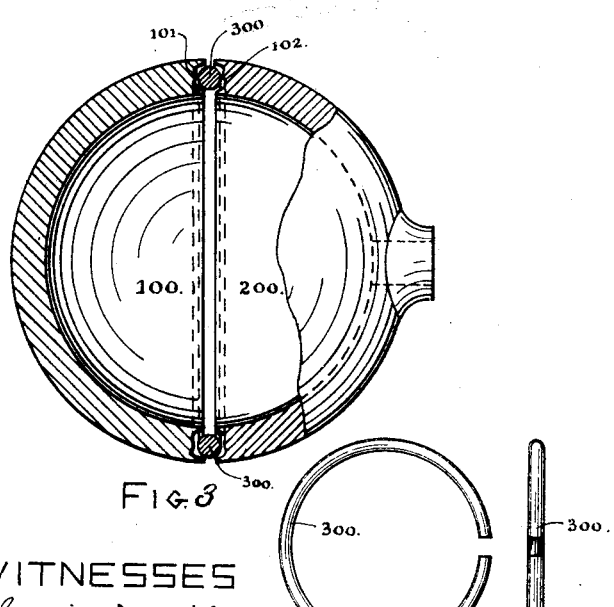
WITNESSES
Suzie M. Dorsett,
Ian G. Cameron
INVENTORS
G. D. Burton,
E. E. Angell,
By F. C. Somes,
Attorney.
THE NORRIS PETERS CO., PHOTO-LITHO., WASHINGTON, D.C.

UNITED STATES PATENT OFFICE.

GEORGE D. BURTON, OF BOSTON, AND EDWIN E. ANGELL, OF SOMERVILLE, MASSACHUSETTS, ASSIGNORS, BY MESNE ASSIGNMENTS, TO SAID BURTON.

APPARATUS FOR BRAZING METALS BY ELECTRICITY.

SPECIFICATION forming part of Letters Patent No. 537,013, dated April 9, 1895.

Application filed April 17, 1893. Serial No. 470,706. (No model.)

*To all whom it may concern:*

Be it known that we, GEORGE DEXTER BURTON, residing at Boston, in the county of Suffolk, and EDWIN ELLIOTT ANGELL, residing at Somerville, in the county of Middlesex, in the State of Massachusetts, citizens of the United States of America, have invented certain new and useful Improvements in Apparatus for Brazing Metals by Electricity, of which the following is a specification.

The object of the invention is to provide means for the brazing of cast iron, which could not heretofore be brazed, and means for economically brazing other metal, in such manner that the brazed joint will be as strong or stronger than other parts of the structure.

In the accompanying drawings, Figure 1 represents a front elevation of an apparatus for carrying out this process, the electrodes thereof being adapted for holding two hemispherical shells to be brazed together to form a hollow sphere. Fig. 2 represents partly in perspective elevation and partly in longitudinal section, a brazed tube the parts of which are united in accordance with this invention. Fig. 3 represents radial sections of two hemispherical shells provided with angular grooves at their meeting edges and the brazing ring disposed therein preparatory to the brazing operation. Fig. 4 represents a plan of a brazing ring or strip. Fig. 5 represents an end elevation thereof.

The same reference numbers indicate the same parts in all the figures.

In carrying out this process a current of large volume is used which may be transformed from a current of high tension by means of a transformer similar to that described in Letters Patent No. 475,232, issued to the Electrical Forging Company, as the assignee of Burton, Eddy and Briggs, dated May 17, 1892, and this transformer may constitute a part of an apparatus similar to that described in said patent, or any other suitable transformer or source of heating current may be employed.

In the drawings the exterior segments of said converter are represented. The lower converter ring 10 may be considered as the positive terminal of the converter and the upper converter ring 11 may be considered as the negative terminal thereof. A bracket 12 extends outward and downward from the ring 10, and a bracket 13 extends outward and downward from the ring 11. The lower ends of these brackets are substantially in the same horizontal plane and each is forked at its lower end, the forked end of the bracket 12 having sleeves or bearings 14 and 16 and the forked end of the bracket 13 having similar sleeves 15 and 17. The converter rings and the brackets are composed of copper or other highly conductive material and are massive in structure to afford passage for a current of large volume. An arm 18 extends from the sleeve 14 and a similar arm 19 extends from the sleeve 17. A shaft 20 is supported in the sleeves 14 and 16 of the bracket 12. This shaft is provided in its outer portion with a longitudinal groove 21. A pinion 23 is disposed on this shaft between the sleeves 14 and 16 and is fastened thereto by means of a pin 24 which engages the groove 21 and locks said pinion and shaft together as regards rotary motion, but permits the shaft to slide independently of said pinion. A spiral spring 25 is disposed on this shaft 20 between a collar at the inner end thereof and the sleeve 16, and tends to thrust said shaft in inward direction. A similar shaft 30 is supported in the sleeves 15 and 17 and adapted to slide therein for the purpose of adjustment. This shaft is provided with a longitudinal groove 32 which extends nearly throughout the length thereof. A collar 35 provided with a set screw 36, is disposed on said shaft on the inner side of the sleeve 15. This collar abuts the sleeve 15 and by adjusting it on the shaft, the position of the shaft can be regulated and determined. A pinion 33 similar to the pinion 23 of the shaft 20 is disposed on the shaft 30 between the sleeves 15 and 17, and fastened thereto for rotary motion by means of a stud which engages the groove 32, said stud permitting the shaft to slide longitudinally independently of said pinion. The shafts 20 and 30 are composed of copper or other highly conductive material.

A clamping head or chuck 40 is disposed at the inner end of the shaft 20 and a similar clamping head or chuck 50 is disposed at the inner end of the shaft 30, these clamping heads being composed of copper or other highly conductive material and serving as electrodes of opposite polarity. The inner faces of these electrodes are concave when they are designed to hold a sphere, or they may be of other shapes to suit the work to be brazed.

A shaft 60 is journaled in the sleeve 18' and 19' at the lower ends of the arms 18 and 19. This shaft is provided with a gear 62 which meshes with the gear 23 of the shaft 20 and with a gear 63 which meshes with the gear 33 of the shaft 30, and it is also provided at its outer end with a hand wheel 65 carrying a handle or crank 67. The shaft 60 is insulated from the shaft bearing 18' by a bushing 64, and the wheel 62 is insulated from the shaft 60 by an insulating bushing 66, these bushings being inserted to prevent a short circuiting of the current through said shaft 60.

In the use of this apparatus, the work, as for instance, two hemispherical shells 100 and 200, is clamped between the electrodes 40 and 50, the meeting edges of said shells having a suitable flux as borax applied thereto, and being preferably provided with grooves 101 and 102, which may be V-shaped, square, irregular or curved, as illustrated in the different figures. A brazing wire 300 composed of brass or any suitable hard solder or brazing compound is disposed in the grooves between the two parts of the work, said wire being sufficiently large in cross section to hold the parts slightly apart. The spring 25 tends to push the chuck 40 toward the chuck 50 and the work is thus clamped between them. The parts being adjusted as shown in Fig. 1 the current is permitted to pass through them. The current passes from the positive ring 10 through the bracket 12 and its sleeves 14 and 16, through the shaft 20, and through the electrode 40 into the part 100 of the work, thence through the brazing ring 300 disposed between the edges to be joined, thence through the part 200, thence through the electrode 50, thence through the shaft 30 to the sleeves 15 and 17, thence through the bracket 13, to the negative ring 11 of the converter or other source of electric current. Owing to the smaller area of the brazing ring and the contact resistance between it and the parts of the work, a heat is quickly developed which raises the edges to be joined and the brazing ring to a brazing temperature. As soon as the heat has sufficiently softened or fused the brazing ring or intermediate piece, the parts of the work are pressed together under the force of the spring 25 and the metal of the ring enters the pores of the metal of the work and firmly unites the parts thereof, forming a strong joint. As soon as the edges of the work come together the conductive area is increased and the resistance to the current thereby diminished, so that the edges of the work do not get overheated or burned. By turning the hand wheel 65 a rotary motion is communicated from the shaft 60 through the gears 62 and 23 to the shaft 20 carrying the electrode 40 and through the gears 63 and 33 to the shaft 30 carrying the electrode 50. This rotation of the work while the brazing metal is running tends to cause an equal distribution thereof throughout the joint and to cause an equal distribution of pressure on the parts of the work.

We claim as our invention—

1. In an electric forge, the combination of two shafts provided with electrodes of opposite polarity, means for adjusting one of said shafts, a spring for pressing one of said electrodes toward the other, and means for rotating said shafts.

2. In an electric forge, the combination of a converter, two brackets connected with opposite poles thereof, and provided with supporting sleeves, shafts adjustable in said sleeves, electrodes connected with the adjacent ends of said shafts, and adjustable with relation to each other, arms connected with said sleeves, an actuating shaft supported in said arms, gears on said shafts, and an actuating wheel for said actuating shaft, substantially as set forth.

GEO. D. BURTON.
EDWIN E. ANGELL.

Witnesses to Geo. D. Burton:
E. F. PHILIPSON,
STEPHEN PORTER.

Witnesses to Edwin E. Angell:
STEPHEN PORTER,
WM. P. PERRY.